United States Patent
Okazaki et al.

(10) Patent No.: US 10,421,378 B2
(45) Date of Patent: Sep. 24, 2019

(54) VEHICLE SEAT

(71) Applicant: TOYOTA BOSHOKU KABUSHIKI KAISHA, Aichi-ken (JP)

(72) Inventors: Yuichi Okazaki, Aichi-ken (JP); Yuta Tsuruta, Aichi-ken (JP)

(73) Assignee: TOYOTA BOSHOKU KABUSHIKI KAISHA, Aichi-ken (JP)

(*) Notice: Subject to any disclaimer, the term of this patent is extended or adjusted under 35 U.S.C. 154(b) by 44 days.

(21) Appl. No.: 15/940,057

(22) Filed: Mar. 29, 2018

(65) Prior Publication Data
US 2018/0281644 A1 Oct. 4, 2018

(30) Foreign Application Priority Data

Apr. 3, 2017 (JP) .................................. 2017-073593

(51) Int. Cl.
*B60N 2/68* (2006.01)
*B60N 2/58* (2006.01)

(52) U.S. Cl.
CPC ............ *B60N 2/68* (2013.01); *B60N 2/5841* (2013.01)

(58) Field of Classification Search
None
See application file for complete search history.

(56) References Cited

U.S. PATENT DOCUMENTS

| 4,844,546 A | 7/1989 | Hanai |
| 4,909,572 A | 3/1990 | Kanai |
| 4,973,105 A | 11/1990 | Itou |
| 6,022,072 A * | 2/2000 | Moyer ................. A47C 7/62 248/909 |
| 7,644,984 B2 * | 1/2010 | Chalhoub ............. B60N 2/58 297/113 |
| 8,282,161 B1 * | 10/2012 | Jacobson ........... B60N 2/6009 224/275 |

(Continued)

FOREIGN PATENT DOCUMENTS

| JP | UM-A-S60-058435 | 4/1985 |
| JP | UMA-H02-087630 | 7/1990 |

(Continued)

OTHER PUBLICATIONS

German Office Action in counterpart German Application No. 10 2018 204 667.0, dated Mar. 18, 2019 (along with English-language translation.

*Primary Examiner* — David E Allred
(74) *Attorney, Agent, or Firm* — Greenblum & Bernstein, P.L.C.

(57) ABSTRACT

A vehicle seat including: a decorative body provided alongside a seat cushion in a seat width direction; a side frame serving as a side framework of one side portion of the seat cushion which is closer to the decorative body than another side portion of the seat cushion; and a side cover covering a peripheral side surface of the seat cushion facing the decorative body, wherein the side frame is disposed at an offset position which is away from the one side portion of the seat cushion to a side where the decorative body is provided in the seat width direction, and wherein the side cover is branched into a drawn-in portion which is drawn downward beyond a gap between the seat cushion and the decorative body, and a cover portion which is connected to the drawn-in portion and covers the side frame from an upper side.

5 Claims, 5 Drawing Sheets

(56) References Cited

U.S. PATENT DOCUMENTS

| | | | |
|---|---|---|---|
| 10,207,600 B2* | 2/2019 | Xu | B60N 2/002 |
| 2010/0148563 A1* | 6/2010 | Fera | A47C 7/62 |
| | | | 297/463.1 |
| 2011/0266820 A1* | 11/2011 | Hurwitz | B60N 2/6009 |
| | | | 296/1.07 |
| 2012/0242115 A1* | 9/2012 | Schreiber | B60N 2/24 |
| | | | 297/180.12 |
| 2013/0057035 A1* | 3/2013 | Nishiura | B60N 2/7011 |
| | | | 297/218.3 |
| 2015/0336528 A1* | 11/2015 | Tanabe | B60R 21/207 |
| | | | 280/728.2 |

FOREIGN PATENT DOCUMENTS

| | | |
|---|---|---|
| JP | UMY2H06-008798 | 3/1994 |
| JP | AH06-247201 | 9/1994 |
| JP | AH10-057200 | 3/1998 |
| JP | A2000-102451 | 4/2000 |
| JP | A2001-070088 | 3/2001 |
| JP | A2002-193049 | 7/2002 |
| JP | A2003-189975 | 7/2003 |
| JP | A2004-122965 | 4/2004 |
| JP | A2011-178261 | 9/2011 |
| JP | A2015-066971 | 4/2015 |
| JP | A2015-182648 | 10/2015 |
| JP | A2015-223872 | 12/2015 |
| JP | A2016-097855 | 5/2016 |
| JP | 2016-117407 | 6/2016 |
| JP | A2018-058457 | 4/2018 |
| JP | A2018-202911 | 12/2018 |

* cited by examiner

VEHICLE SEAT

CROSS-REFERENCE TO RELATED APPLICATIONS

This application claims priority from Japanese Patent Application No. 2017-073593 filed on Apr. 3, 2017, the entire contents of which are incorporated herein by reference.

TECHNICAL FIELD

The disclosure relates to a vehicle seat. In particular, the disclosure relates to a vehicle seat that includes a decorative body provided alongside a seat cushion in a seat width direction, a side frame serving as a side framework of one side portion the seat cushion which is closer to the decorative body than another side portion of the seat cushion, and a side cover covering a peripheral side surface of the seat cushion facing the decorative body.

BACKGROUND

A vehicle seat having a configuration in which a cup holder is provided in an inside region of a seat cushion is known (see JP-A-2016-117407). The cup holder is provided in a state of being accommodated in a partial region inside the seat cushion.

However, in a case where the decorative body constituting the cup holder is provided alongside a side of the seat cushion, foreign matters may enter a gap between the seat cushion and the decorative body. At this time, when a side frame of the seat cushion is provided to protrude into the gap, a problem that foreign matters bite into the side frame or the like may occur.

SUMMARY

An object to be achieved by the disclosure is to appropriately prevent foreign matters from reaching the side frame from the gap between the seat cushion and the decorative body.

In order to achieve the above object, the vehicle seat of the disclosure adopts the following means.

According to a first aspect, there is provided a vehicle seat including: a decorative body provided alongside a seat cushion in a seat width direction; a side frame serving as a side framework of one side portion of the seat cushion which is closer to the decorative body than another side portion of the seat cushion; and a side cover covering a peripheral side surface of the seat cushion facing the decorative body, wherein the side frame is disposed at an offset position which is away from the one side portion of the seat cushion to a side where the decorative body is provided in the seat width direction, and wherein the side cover is branched into a drawn-in portion which is drawn downward beyond a gap between the seat cushion and the decorative body, and a cover portion which is connected to the drawn-in portion and covers the side frame from an upper side.

According to the first aspect, since the side cover is branched into the drawn-in portion and the cover portion, it is possible to appropriately cover the side frame disposed away from the seat cushion from the upper side by the cover portion while stretching the side cover by the drawn-in portion. In this manner, it is possible to appropriately prevent foreign matters from reaching the side frame from the gap between the seat cushion and the decorative body.

DETAILED DESCRIPTION

Hereinafter, embodiments for carrying out the disclosure will be described with reference to the drawings.

First Embodiment

<Schematic Configuration of Seat 1>

Figure 1:
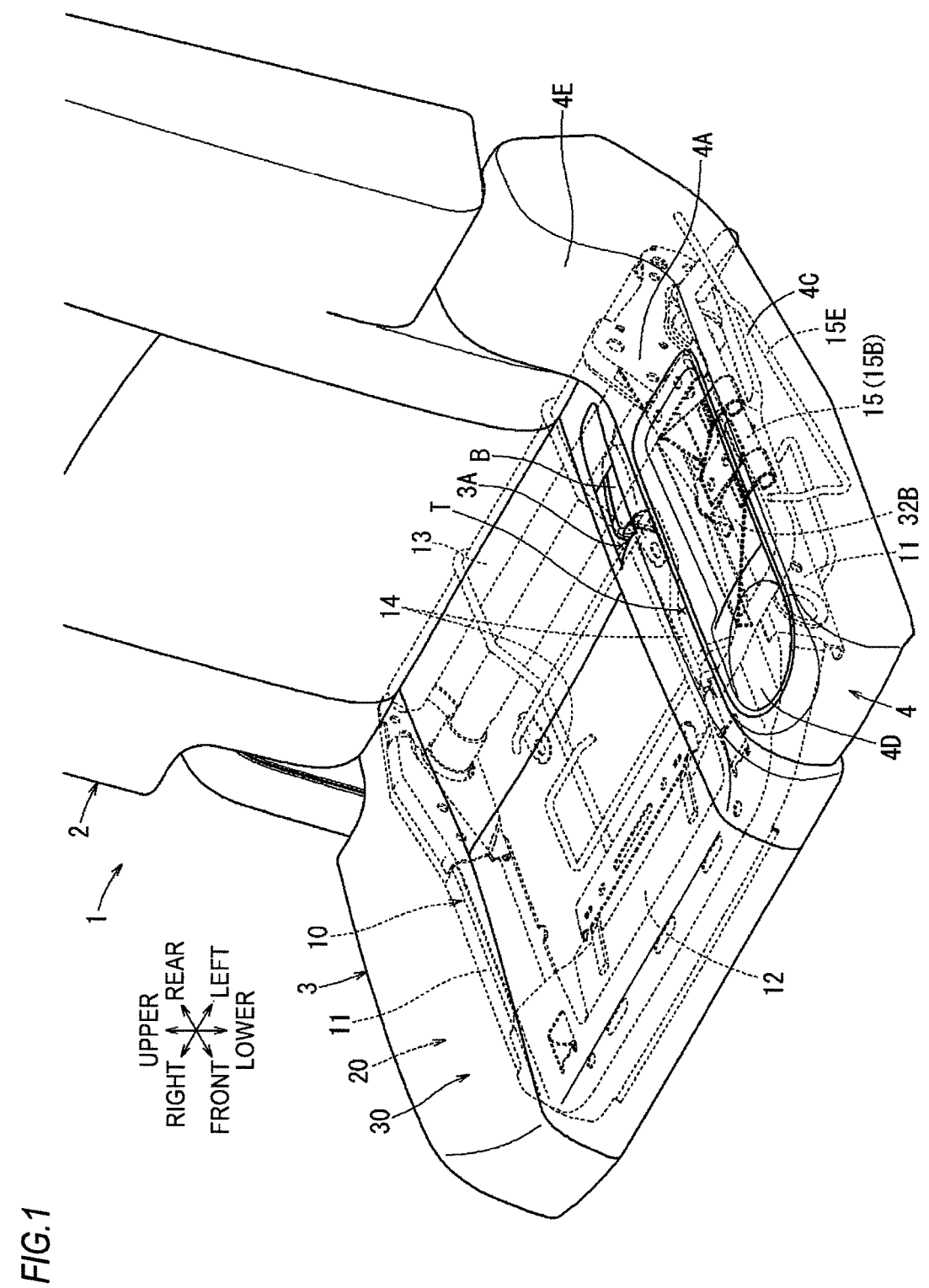
FIG. 1 is a perspective view showing a schematic configuration of a vehicle seat of a first embodiment.

First, a configuration of a seat 1 (vehicle seat) according to a first embodiment will be described with reference to FIGS. 1 to 5. Meanwhile, in the following description, the directions such as a front and rear direction, an upper and lower direction and a right and left direction refer to the respective directions as indicated in each of the drawings. Further, the "seat width direction" refers to the left and right direction of the seat 1. As shown in FIG. 1, the seat 1 of the first embodiment is configured as a rear seat of an automobile. Specifically, the seat 1 is configured as a right divided seat of two adjacent divided seats which are divided by 5:5 on the left and right sides of the same row. The seat 1 includes a seat back 2 serving as a backrest of a seated person and a seat cushion 3 serving as a seating part.

Lower end portions on both left and right sides of the seat back 2 are supported by being connected to rear end portions on both left and right sides of the seat cushion 3 via recliners (not shown), respectively. The seat cushion 3 is supported by being connected on a floor of a vehicle. The seat 1 is configured such that a resin center console 4 having a recessed cup holder 4D is provided adjacent to the left side (the side adjacent to the left divided seat (not shown)) of the seat cushion 3. Here, the center console 4 corresponds to the "decorative body" in the disclosure.

<Center Console 4>

At a position in a seat width direction within a lateral width region of the seat back 2, the center console 4 is provided alongside the seat cushion 3 in the seat width direction. Specifically, the lateral width of the seat cushion 3 is substantially aligned with the seat back 2 on the right side, but is shorter than the seat back 2 on the left side. Further, the center console 4 is disposed in a shortened empty region on the left side of the seat cushion 3, and the total lateral width of the center console 4 and the seat cushion 3 is substantially the same as the lateral width of the seat back 2. The center console 4 is integrally assembled with a cushion frame 10 forming a framework of the seat cushion 3. With the above assembly, the center console 4 is provided in a state of being integrated with the seat cushion 3.

Figure 5:
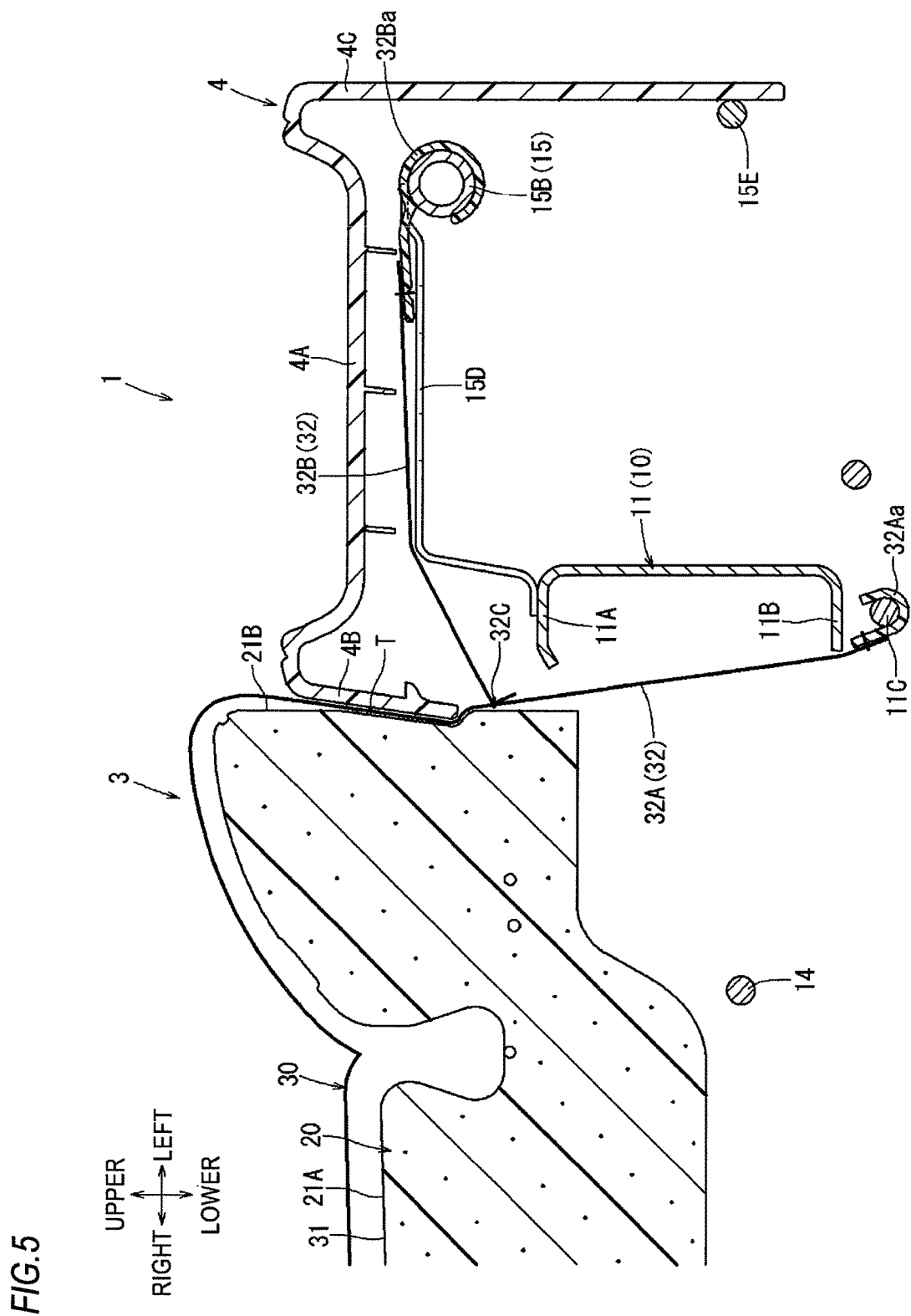
FIG. 5 is a sectional view taken along the line V-V in FIG. 3.

At a rear end portion of the center console 4, an expansion part 4E protruding from the lower side is formed in an empty portion of the left lower corner portion of the seat back 2. A left connecting portion between the seat back 2 and the seat cushion 3 is covered from the left side by the expansion part 4E. As shown in FIG. 5, the center console 4 is formed in a substantially box shape with no bottom and has a top plate part 4A having a substantially flat surface facing the upper side on the left side of the seat cushion 3, a right plate part 4B extending downward slightly to the right lower side from a right edge of the top plate part 4A, and a left plate part 4C extending downward from a left edge of the top plate part 4A. The top plate part 4A is disposed at substantially the same height position as a top plate main surface (upper surface of a top plate cover 31 of a cushion cover 30 to be described later) of the seat cushion 3. Further, the right plate part 4B is set in a state of being pressed against a left surface (left surface of a side cover 32 of the cushion cover 30 to be described later) of the seat cushion 3 with a slight interference.

<Specific Configuration of Seat Cushion 3>

As shown in FIGS. 1 and 5, the seat cushion 3 generally includes the metallic cushion frame 10 forming its framework, a foam urethane cushion pad 20 set on an upper portion of the cushion frame 10 and elastically receiving the load of a seated person, and the fabric cushion cover 30 that covers the entire surface of the cushion pad 20 to configure a design surface of the seat cushion 3.

<Cushion Frame 10>

The cushion frame 10 is formed in a substantially rectangular frame shape in a plan view and includes a pair of left and right side frames 11 forming a side framework, a front panel 12 forming a front framework and bridged between front portions of the side frames 11 from the upper side, and a rear pipe 13 forming a rear framework and bridged between rear portions of the side frames 11. Further, a plurality of pad support wires 14 serving to support the cushion pad 20 from the lower side at a plurality of positions in a seat width direction are bridged between the front panel 12 and the rear pipe 13 of the cushion frame 10.

Figure 3:
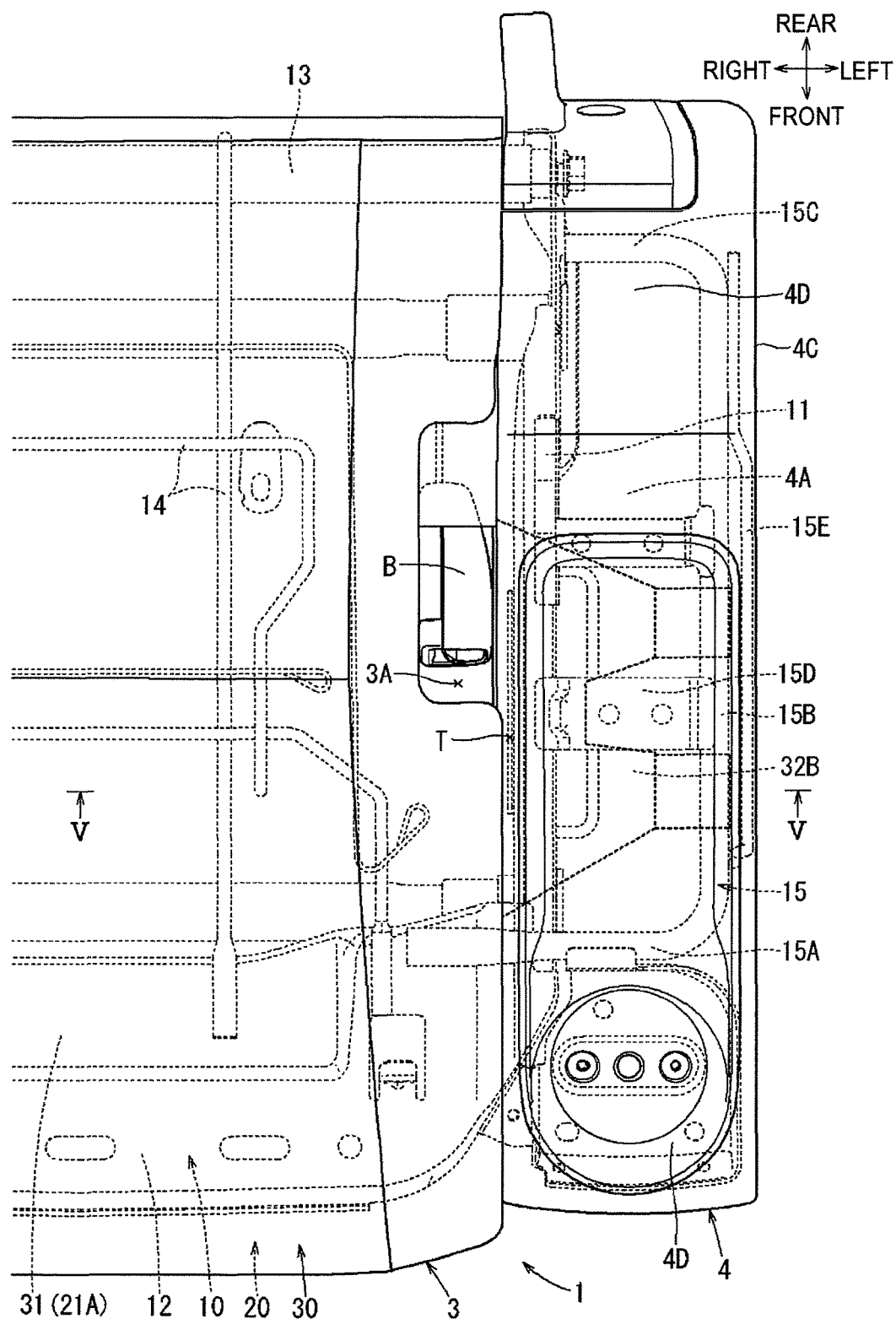
FIG. 3 is an expanded plan view showing an adjacent portion between a seat cushion and a center console.
Figure 4:
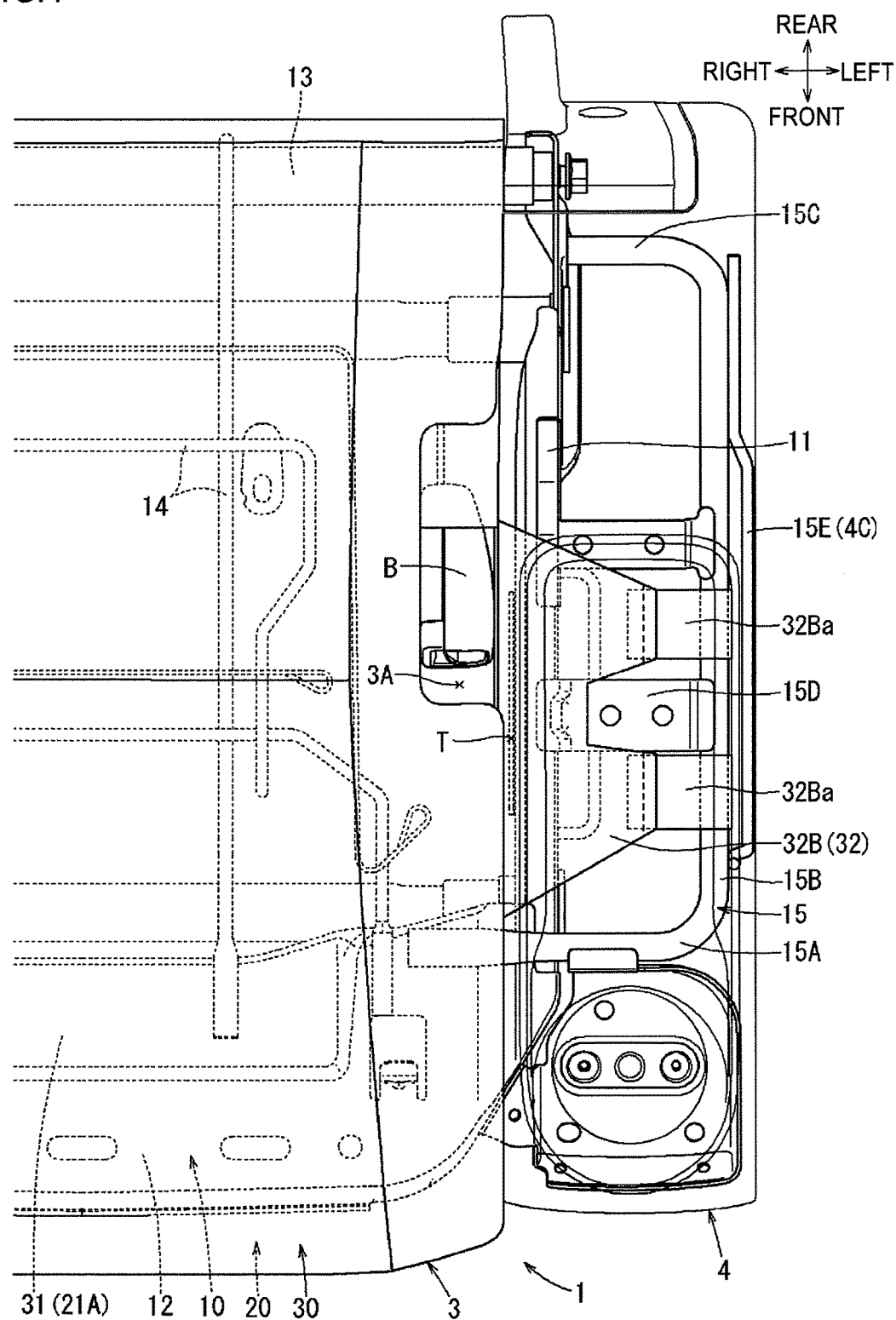
FIG. 4 is a plan view visualizing the center console in FIG. 3.

Specifically, in the cushion frame 10, as shown in FIG. 1, the right side frame 11 is disposed at a position within a lateral width region of the seat cushion 3. However, as shown in FIGS. 3 to 5, the left side frame 11 is disposed at an offset position away from the lateral width region of the seat cushion 3 to the left side and to a region just below the center console 4. Further, a support frame 15 is attached to the cushion frame 10. The support frame 15 is made of a round pipe material bent into a substantially U shape in a plan view so as to protrude toward the left side from the left side frame 11 which is disposed at the offset position.

Specifically, as shown in FIG. 4, the support frame 15 has a structure bent in a substantially U shape in a plan view, which is formed by a front arm portion 15A that extends to the left side from a front region of the left side frame 11, an extending portion 15B that extends to be bent to the rear side from an end portion of the front arm portion 15A extended to the left side, and a rear arm portion 15C that extends to be bent to the right side from an end portion of the extending portion 15B extended to the rear side. The front arm portion 15A passes over an upper surface portion of the left side frame 11 and is welded in a state of being brought into contact with an upper surface portion on the left side of the front panel 12, and the rear arm portion 15C is inserted and welded to a rear portion of the left side frame 11 from the left side. In this manner, the support frame 15 is integrally coupled to the cushion frame 10.

Figure 2:
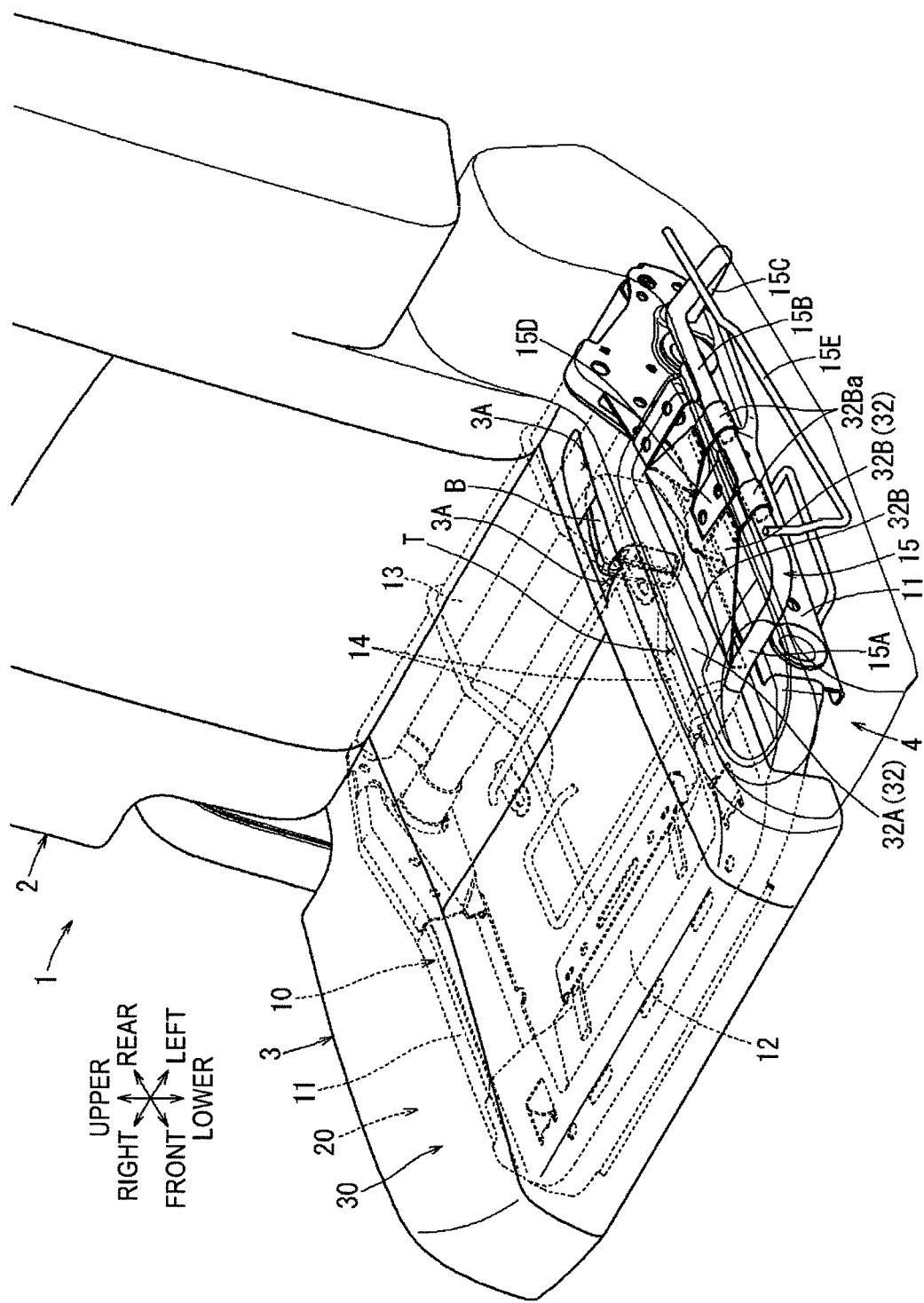
FIG. 2 is a perspective view showing an internal structure of the vehicle seat.

Further, as shown in FIGS. 4 and 5, a support plate 15D serving as a support for supporting the top plate part 4A of the center console 4 from the back side is bridged between the extending portion 15B of the support frame 15 and the upper surface portion of the left side frame 11. As shown in FIG. 5, the support plate 15D is formed in a bent plate shape which rises upright from a top of the upper surface portion of the side frame 11 and is bent to extend substantially horizontally toward the extending portion 15B of the support frame 15 from that portion. Further, as shown in FIGS. 2, 4 and 5, a fixing wire 15E extending from the extending portion 15B to the lower left side and coupled to an inner surface portion of the left plate part 4C of the center console 4 is integrally coupled to the support frame 15. A clip (not shown) formed in the inner surface portion of the left plate part 4C of the center console 4 is fitted and mounted on the fixing wire 15E, so that the left plate part 4C is held without being rattled in respective directions such as the upper and lower direction and the left and right direction.

Here, as shown in FIG. 5, the left side frame 11 is positioned so as to extend in the front and rear direction along a region substantially just below the right edge of the top plate part 4A of the center console 4. Specifically, the left side frame 11 is arranged at a position away to the left side from the lower end portion of the right plate part 4B extending downward slightly to the right lower side from the right edge of the top plate part 4A. The left side frame 11 is formed in a cross section shape that has an upper flange 11A and a lower flange 11B. The upper flange 11A extends to be bent substantially at a right angle from an upper edge of a main body portion extending in a standing plate shape to the right side. The lower flange 11B extends to be bent substantially at a right angle from a lower edge of the main body portion to the right side. The left side frame 11 is arranged such that an end portion of the upper flange 11A extended to the right side is away from a lower end portion of the right plate part 4B of the center console 4 to the left side.

<Cushion Pad 20>

The cushion pad 20 is set in a state of being covered on the cushion frame 10 from the upper side. Specifically, as shown in FIGS. 1 and 2, the cushion pad 20 is set in a state of being covered on the right side frame 11, the front panel 12 and the rear pipe 13 constituting the cushion frame 10 from the upper side and is provided in a state of being strongly supported from the lower side by these frame structures. As shown in FIGS. 4 and 5, the cushion pad 20 is not covered on the left side frame 11. However, as shown in FIG. 4, the cushion pad 20 is supported over a wide range by the plurality of pad support wires 14 bridged between the front panel 12 and the rear pipe 13 from the lower side. With the above support, the region of the cushion pad 20, which is not covered on the left side frame 11, is also supported by the pad support wires 14 in a stable manner.

The cushion pad 20 is set on the upper portion of the cushion frame 10, and then, is fixed in position on the cushion frame 10 by the cushion cover 30 covered on the entire surface thereof. Specifically, after the cushion pad 20 is set on the upper portion of the cushion frame 10, each of front, rear, left and right peripheral edges of the cushion cover 30 covered on the entire surface of the cushion pad 20 is fixed by being drawn below the cushion frame 10. In this way, the cushion pad 20 is held in a state of being integrally pressed against the cushion frame 10 via the cushion cover 30.

<Cushion Cover 30>

The cushion cover 30 is covered on a top plate surface 21A of the cushion pad 20 from the upper side, and then, each of front, rear, left and right peripheral edges thereof is drawn downward beyond each peripheral side surface 21B of the cushion pad 20 and fixed to the cushion frame 10.

With this drawing, the cushion cover 30 is stretched in a state of being in wide close contact with the entire surface of the cushion pad 20. Specifically, as shown in FIG. 5, the side cover 32 of the cushion cover 30 drawn downward beyond the left peripheral side surface 21B of the cushion pad 20 is drawn downward from a joint portion with the top plate cover 31 covered on the top plate surface 21A of the cushion pad 20 beyond a gap T between the right plate part 4B of the center console 4 and the side cover 32 as described below.

That is, the side cover 32 includes a drawn-in portion 32A and a cover portion 32B. The drawn-in portion 32A is drawn downward beyond the gap T between the left peripheral side surface 21B of the cushion pad 20 and the right plate part 4B of the center console 4. The cover portion 32B is sewn to an intermediate portion (branch portion 32C) of the drawn-in portion 32A and is provided in a state of covering the left side frame 11 from the upper side. The drawn-in portion 32A is drawn downward beyond the right region of the left side frame 11. Further, an edge of the drawn-in portion 32A drawn downward is fixed by being hooked from the lower side to a hook wire 11C integrally attached to the lower portion of the left side frame 11 by a resin J-hook 32Aa attached along the same edge. With this fixation, the drawn-in portion 32A is covered in a state of being in close contact with the left peripheral side surface 21B of the cushion pad 20 by the drawn tension.

The cover portion 32B is sewn to an intermediate portion (branch portion 32C) of the drawn-in portion 32A extending downwardly beyond the right plate part 4B of the center console 4 and is drawn to the left side beyond the upper region of the left side frame 11 from the sewn portion. Then, an edge of the cover portion 32B drawn to the left side is fixed by being hooked from the upper side to the extending portion 15B of the support frame 15 by a resin J-hook 32Ba attached along the same edge. With this fixation, the cover portion 32B partially rides on the support plate 15D bridged between the extending portion 15B of the support frame 15 and the left side frame 11 and is covered in a state of applying a tensile force for drawing the drawn-in portion 32A to the right plate part 4B of the center console 4 by the drawn tension.

Since the cover portion 32B is covered in a state of being drawn to the left side as described above, a tension to the left side is applied to the drawn-in portion 32A so that the gap T between the right plate part 4B of the center console 4 and the drawn-in portion 32A of the side cover 32 covered on the left peripheral side surface 21B of the cushion pad 20 is difficult to become larger in the seat width direction. Further, the left side frame 11 is covered from the upper side by the cover portion 32B in the stretched state. As a result, foreign matters are appropriately prevented from entering the left side frame 11 from the gap T between the seat cushion 3 and the center console 4 from the upper side. Thus, there is no possibility that foreign matters bite into the upper flange 11A of the left side frame 11 protruding to the lower side of the gap T.

Specifically, the extending portion 15B of the support frame 15 to which the cover portion 32B is drawn-in is located higher than the branch portion 32C at which the cover portion 32B is sewn with the drawn-in portion 32A. With the above configuration, the cover portion 32B is stretched between the branch portion 32C and the extending portion 15B of the support frame 15 in a state of being inclined toward the left upper side (in a lifting shape) from the branch portion 32C with the drawn-in portion 32A, so that the foreign matters entering the gap T are not dropped to a position lower than the branch portion 32C.

Further, as shown in FIG. 4, the cover portion 32B extends to be tapered in a substantially trapezoidal shape from the branch portion 32C (see FIG. 5), which is a sewn portion with the drawn-in portion 32A, toward the left side. The cover portion 32B is drawn and fixed to the extending portion 15B of the support frame 15 extending in the front and rear direction. With the above configuration, it is possible to widen the coupling width in the front and rear direction of the cover portion 32B to the drawn-in portion 32A even in a case where it is not possible to hook the cover portion 32B to the extending portion 15B of the support frame 15 in a wide width in the front and rear direction.

An end portion of the cover portion 32B extended to the left side is hooked to the extending portion 15B of the support frame 15. The hooked end portion is cut out so as to avoid interference with the support plate 15D at an intermediate portion in the front and rear direction. The J-hook 32Ba is attached to each of the front and rear portions of the hooked end portion divided by the cutout. The cover portion 32B is separately fixed to the extending portion 15B by the J-hook 32Ba at two positions (a plurality of positions) in the front and rear direction where the support plate 15D is sandwiched.

More specifically, the cover portion 32B extends in the front and rear direction from the position slightly rearward of the position where the front arm portion 15A of the support frame 15 is extended to the left side up to the position where it is aligned in the seat width direction with the substantially central portion of a concave portion 3A in which a seat belt buckle B disposed at the left rear corner portion of the seat cushion 3 is received. With the above configuration, the cover portion 32B is provided in a state of covering the left side frame 11 over a wide range in the front and rear direction from the upper side. Meanwhile, since the region beyond the cover portion 32B to the front side is the region where the front panel 12 is covered on the upper portion of the left side frame 11, there is no problem that foreign matters bite into the left side frame 11 even when foreign matters enter the region.

SUMMARY

To summarize the above, the seat 1 of the present embodiment has the following configurations. That is, the vehicle seat (seat 1) includes a decorative body (center console 4) provided alongside a seat cushion (seat cushion 3) in a seat width direction, a side frame (left side frame 11) serving as a side framework of one side portion of the seat cushion (seat cushion 3) which is closer to the decorative body (center console 4) than another side portion of the seat cushion (seat cushion 3), and a side cover (side cover 32) covering a peripheral side surface (left peripheral side surface 21B) of the seat cushion (seat cushion 3) facing the decorative body (center console 4). The side frame (left side frame 11) is disposed at an offset position which is away from the one side portion of the seat cushion (seat cushion 3) to a side (left side) where the decorative body (center console 4) is provided in the seat width direction. The side cover (side cover 32) is branched into a drawn-in portion (drawn-in portion 32A) which is drawn downward beyond a gap (gap T) between the seat cushion (seat cushion 3) and the decorative body (center console 4), and a cover portion (cover portion 32B) which is connected to the drawn-in portion (drawn-in portion 32A) and covers the side frame (left side frame 11) from an upper side.

In this manner, since the side cover (side cover 32) is branched into the drawn-in portion (drawn-in portion 32A) and the cover portion (cover portion 32B), it is possible to appropriately cover the side frame (left side frame 11) disposed away from the seat cushion (seat cushion 3) from the upper side by the cover portion (cover portion 32B) while stretching the side cover (side cover 32) by the drawn-in portion (drawn-in portion 32A). In this manner, it is possible to appropriately prevent foreign matters from reaching the side frame (left side frame 11) from the gap (gap T) between the seat cushion (seat cushion 3) and the decorative body (center console 4).

Further, the vehicle seat (seat 1) further includes a support frame (support frame 15) fixed to the side frame (left side frame 11) and supporting the decorative body (center console 4). The drawn-in portion (drawn-in portion 32A) is fixed to the side frame (left side frame 11), and the cover portion (cover portion 32B) is fixed to the support frame (support frame 15). With such a configuration, the drawn-in portion (drawn-in portion 32A) and the cover portion (cover portion 32B) of the side cover (side cover 32) can be fixed in a state of being strongly supported on the side frame (left side frame 11) and the support frame (support frame 15) fixed to the side frame (left side frame 11), respectively.

Further, the side cover (side cover 32) includes a branch portion (branch portion 32C) at which the side cover (side cover 32) is branched into the drawn-in portion (drawn-in portion 32A) and the cover portion (cover portion 32B). The branch portion (branch portion 32C) is provided to a portion of the side cover (side cover 32) which is drawn downward beyond the gap (gap T) between the seat cushion (seat cushion 3) and the decorative body (center console 4). A fixing portion (hook portion of J-hook 32Ba to the extending portion 15B) at which the cover portion (cover portion 32B) is fixed to the support frame (support frame 15) is located higher than the branch portion (branch portion 32C). With such a configuration, the cover portion (cover portion 32B) can be provided in a lifting shape, so that it is possible to more appropriately prevent foreign matters from reaching the side frame (left side frame 11).

Further, the cover portion (cover portion 32B) extends between the branch portion (branch portion 32C) and the fixing portion (hook portion of J-hook 32Ba to the extending portion 15B). With such a configuration, the cover portion (cover portion 32B) can be provided in a state of being diagonally lifted from the branch portion (branch portion 32C), so that it is possible to more appropriately prevent foreign matters from reaching the side frame (left side frame 11).

Further, the support frame (support frame 15) includes an extending portion (extending portion 15B) extending in a front and rear direction. The cover portion (cover portion 32B) is fixed to a plurality of positions of the extending portion (extending portion 15B) in the front and rear direction. With such a configuration, the cover portion (cover portion 32B) can be appropriately bridged between the side cover (side cover 32) and the support frame (support frame 15) over a wide range in the front and rear direction.

OTHER EMBODIMENTS

Although the embodiments of the disclosure have been described above using one embodiment, the disclosure can be implemented in various forms other than the above embodiment. For example, the "vehicle seat" of the disclosure may be widely applied to seats provided for various vehicles other than automobiles, such as trains, aircrafts or ships, in addition to the seats of the automobile other than the rear seat.

Further, in addition to the center console, the decorative body provided alongside the seat cushion in the seat width direction may be an arbitrary member such as a side shield covering a seat side surface or a table provided on a seat side, so long as it is provided alongside the seat cushion in the seat width direction. Further, the decorative body may be a seat cushion of an adjacent seat. The decorative body may be provided alongside the seat cushion on either side in the seat width direction.

Further, the side cover covering the peripheral side surface of the seat cushion facing the decorative body may be made of a material other than the fabric material, such as a leather material. The side cover may be branched from a position where the cover portion is coupled to the drawn-in portion by sewing or the like, or may be branched from a position where the drawn-in portion is coupled to the cover portion by sewing or the like.

Further, the cover portion may be made of a covering material different from that of the drawn-in portion. In addition, the cover portion may be connected to the drawn-in portion and provided in a state of covering the side frame from the upper side. The cover portion may be provided in a loosened state, in addition to being provided in a stretched state. The cover portion may be fixed to the decorative body, in addition to being fixed to the support frame fixed to the side frame. Further, the cover portion may be provided to be hung in a state of simply covering the side frame from the upper side, instead of being fixed to the member described above.

What is claimed is:

1. A vehicle seat comprising:
    a decorative body provided alongside a seat cushion in a seat width direction;
    a side frame serving as a side framework of one side portion of the seat cushion which is closer to the decorative body than another side portion of the seat cushion; and
    a side cover covering a peripheral side surface of the seat cushion facing the decorative body,
    wherein the side frame is disposed at an offset position spaced laterally outwardly relative to the seat cushion which is away from the one side portion of the seat cushion, wherein the offset position is vertically below at least a portion of the decorative body, and
    wherein the side cover is branched into a drawn-in portion which is drawn downward beyond a gap between the seat cushion and the decorative body, and a cover portion which is connected to the drawn-in portion and covers the side frame from an upper side.

2. The vehicle seat according to claim 1, further comprising:
    a support frame fixed to the side frame and supporting the decorative body,
    wherein the drawn-in portion is fixed to the side frame, and the cover portion is fixed to the support frame.

3. The vehicle seat according to claim 2,
    wherein the side cover includes a branch portion at which side cover is branched into the drawn-in portion and the cover portion,
    wherein the branch portion is provided by a portion of the side cover which is drawn downward beyond the gap between the seat cushion and the decorative body, and wherein a fixing portion at which the cover portion is fixed to the support frame is located higher than the branch portion.

4. The vehicle seat according to claim 3,
wherein the cover portion extends between the branch portion and the fixing portion.

5. The vehicle seat according to claim 2,
wherein the support frame includes an extending portion extending in a front and rear direction, and
wherein the cover portion is fixed t-e at a plurality of positions on the extending portion in the front and rear direction.

\* \* \* \* \*